UNITED STATES PATENT OFFICE.

ISAAC WINSLOW, OF PHILADELPHIA, PENNSYLVANIA, ASSIGNOR TO JOHN W. JONES, OF PORTLAND, MAINE.

IMPROVEMENT IN PRESERVING VEGETABLES IN HERMETICALLY-SEALED CANS.

Specification forming part of Letters Patent No. 36,326, dated August 26, 1862.

*To all whom it may concern:*

Be it known that I, ISAAC WINSLOW, of Philadelphia, in the county of Philadelphia and State of Pennsylvania, have invented a new and useful Improved Process of Preserving Green Corn; and I do hereby declare that the following is a full and exact description thereof.

My invention consists in a peculiar process of cooking, hermetically sealing, and preserving green corn without drying the same.

In preserving green sugar-corn by first inclosing and hermetically sealing it in cans, and then boiling the same until the corn is thoroughly cooked, I have found it necessary to use very strong cans because of their liability to burst from the expansion of the air and the production of steam within the cans. After the corn is thus cooked the heads or ends of the cans, upon being cooled, remain pressed outward, so as to give the cans the appearance of containing the gaseous products of spoiled corn. This appearance of the cans is very objectionable to the trade, all dealers and most purchasers being prejudiced against such cans, supposing them to contain spoiled corn.

In order to remedy the difficulty of bursting the cans and to enable dealers to apply to my cans of corn the common test by which they judge whether fruits or other substances (which are cooked previous to being hermetically sealed) are in good condition, I have invented an improved process by which the cans are relieved from the internal expansive pressure, and at the same time the aroma and juices of the corn are substantially prevented from escaping.

My improved method of preserving green corn may be practiced as follows: Select the sweet variety of Indian corn or maize, just in the milk state, and remove the kernels from the cob. This may be most conveniently done by means of a curved knife invented for the purpose. Then pack the corn in cans and hermetically seal the latter. Now expose the cans to boiling water or steam heat for a short time—say about ten minutes—and then puncture each can, so as to allow the air to escape from the cans, and then seal each can immediately up to prevent the escape of the aroma of the corn or the evaporation of its juices. After resealing the cans the heat should be continued until the corn is thoroughly cooked—say about four hours. After the process of cooking is completed the cans may be slowly cooled in a warm room.

Corn preserved in this way appears to be quite as sweet and of the same fine flavor as corn preserved without puncturing the cans, as described in another application for Letters Patent made by me. This process now presented possesses two advantages over the process described in the application above mentioned. First, it removes from the can the pressure caused by the expansion of the contained air and renders the latter less liable to burst when boiled; second, it enables the purchasers of the preserved corn to apply the same test to it that they usually apply to other articles preserved in cans—namely, the concavity of the ends or heads of the cans, such heads being convex with cans not punctured during the process of cooking.

Of course I do not confine myself to any precise time for puncturing the cans, though I recommend the time above mentioned.

A very good article of preserved corn may be obtained by filling and sealing the cans, leaving a small vent or puncture, yet the resulting article will be inferior to that made by the process above described.

Having thus fully described my invention, what I claim, and desire to secure by Letters Patent of the United States, is—

Preventing the bursting of hermetically-sealed cans or other vessels, while they are exposed to heat for cooking or preserving their contents, by means of puncturing such cans or vessels when first heated or otherwise giving vent to the contained air soon after heating, the cans or vessels being thereafter immediately resealed and the heat continued, substantially in the manner and for the purposes set forth.

ISAAC WINSLOW.

Witnesses:
WILLIAM HINKLE,
WILLIAMS OGLE.